Figure 1:
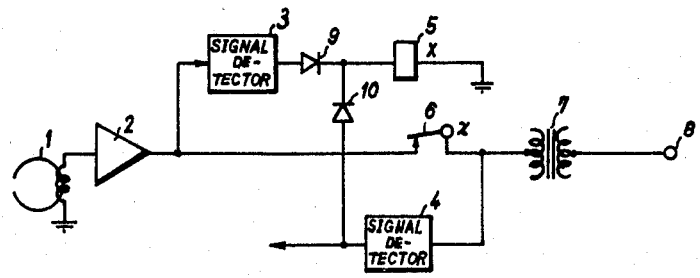

United States Patent [19]

Eguchi

[11] 3,974,401

[45] Aug. 10, 1976

[54] SYSTEM FOR DETECTING THE TRANSMISSION DIRECTION OF A SIGNAL ON A TWO-WAY TRANSMISSION LINE

[75] Inventor: Hisashi Eguchi, Machida, Japan

[73] Assignee: Iwasaki Tsushinki Kabushiki Kaisha, Japan

[22] Filed: Jan. 9, 1974

[21] Appl. No.: 431,980

[30] Foreign Application Priority Data

Jan. 10, 1973 Japan................. 48-5284
Jan. 10, 1973 Japan................. 48-5285

[52] U.S. Cl.................. 307/241; 307/254
[51] Int. Cl.[2] ......................... H03K 17/00
[58] Field of Search............. 179/19, 26, 17 B, 30, 179/6 E; 307/241–243, 249, 254, 255; 333/7, 10

[56] References Cited
UNITED STATES PATENTS

| | | | |
|---|---|---|---|
| 2,715,657 | 8/1965 | Adrews, Jr............ | 179/26 |
| 3,129,289 | 4/1964 | Seemann............... | 179/19 |
| 3,366,849 | 1/1968 | Raedt et al............ | 179/19 |
| 3,699,265 | 10/1972 | Altenburger.......... | 179/19 |

Primary Examiner—Stanley D. Miller, Jr.
Assistant Examiner—B. P. Davis
Attorney, Agent, or Firm—Robert E. Burns; Emmanuel J. Lobato; Bruce L. Adams

[57] ABSTRACT

A system for detecting the transmission direction of a signal on a two-say transmission line, in which a switch is inserted in the two-way transmission line while a signal detector is connected to the two-way transmission line at one side of the switch. Two signal detectors may be connected to the two-way transmission line at both sides of the switch respectively. If the switch has two selected contacts, the two signal detectors are connected to the selected contacts respectively. The switch is switched in response to the output of the signal detector or the outputs of the two signal detectors. The transmission direction of the signal on the two-way transmission line is detected in accordance with the state of the signal detector and the states of the two signal detector after the switching of the switch.

5 Claims, 5 Drawing Figures

SYSTEM FOR DETECTING THE TRANSMISSION DIRECTION OF A SIGNAL ON A TWO-WAY TRANSMISSION LINE

This invention relates to systems for detecting the transmission direction of a signal on a two-way transmission line in a case, for example, where a lock-out tone from a station is to be detected when recorded contents are regenerated in the transmission line from a telephone answering and recording device in response to a remote control operation.

In conventional telephone answering and recording devices, detection of a lock-out tone sent out from a station in response to the abandonment of a call by a calling subscriber it is sometimes necessary to amplify control functions thereof. In this case, the detection of the lock-out tone sent out from the station in the case where the recorded contents are regenerated from the telephone answering and recording device in response to a remote control operation is very difficult since the lock-out tone from the station must be clearly distinguished from the regenerated, recorded contents including a lock-out tone. Accordingly, the lock-out tone cannot be detected by conventional devices of the type in a case where the recorded contents are regenerated.

An object of this invention is to provide a system for detecting the transmission direction of a signal on a two-way transmission line in a case where a memory device regenerates its stored contents including a lock-out tone while a lock-out tone sent out from a station is to be detected.

Figure 2:
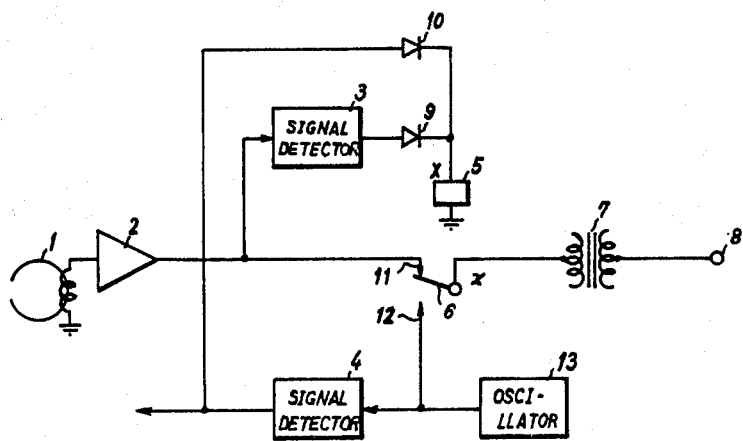
Figure 3:
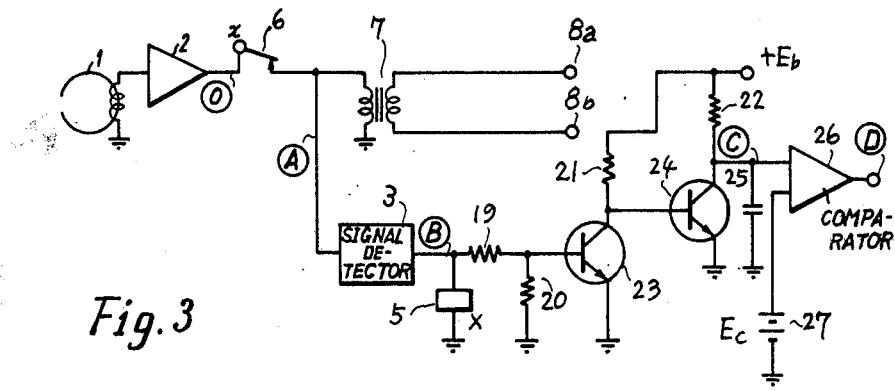
Figure 4:
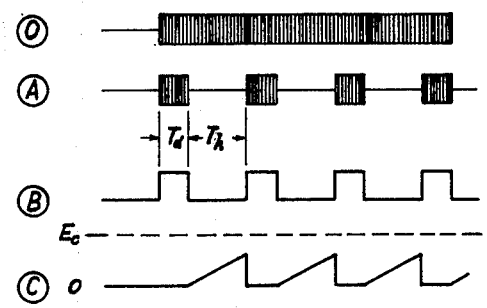
Figure 5:
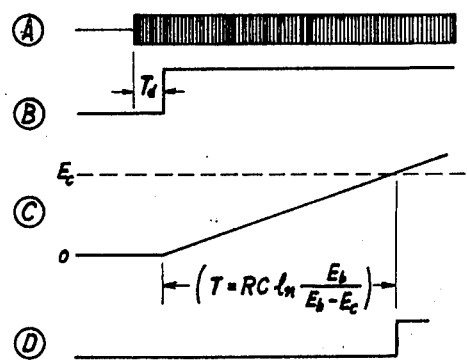

The principle, construction and operations of this invention will be clearly understood from the following detailed description taken in conjunction with the accompanying drawings, in which:

FIGS. 1, 2 and 3 are circuit diagrams each illustrating an example of this invention; and FIGS. 4 and 5 are time charts explanatory of the operations of the example shown in FIG. 3.

With reference to FIG. 1, an example of this invention comprises a regenerating magnetic head 1, an amplifier 2 connected to the output of the magnetic head 1, a first signal detector 3 connected to the output of the amplifier 2 for detecting a lock-out tone, a second signal detector 4 for detecting a lock-out tone, a relay winding 5 of a relay X connected to the outputs of the signal detectors 3 and 4 through diodes 9 and 10 respectively, contacts 6 of the relay X, a transformer 7, and a terminal 8 connected to a two-way transmission line. The terminal 8 is connected to the primary winding of the transformer 7. The secondary winding of the transformer 7 is connected to the input of the second signal detector 4 and one of the contacts 6. The other of the contacts 6 is connected to the output of the amplifier 2.

It is assumed that the signal detectors 3 and 4 have delay times $T_{d1}$ and $T_{d2}$ respectively to generate their detection outputs from the respective application instants of a lock-out tone and have holding times $T_{h1}$ and $T_{h2}$ respectively to terminate the above detection outputs from the respective termination of the lock-out tone. Moreover, the above times have the following relationship:

$$T_{d1} < T_{d2} < T_{d1} + T_{h1}$$

In operation, when a lock-out tone is received from the terminal 8 or regenerated through the magnetic head 1, the first signal detector 3 at first detects it after the time $T_{d1}$ and actuates the winding 5 of the relay X through the diode 9 to open the contacts 6. If the lock-out tone is regenerated from the magnetic head 1 and the amplifier 2, the second signal detector 4 loses the input thereof in response to the opening of the contacts 6. Accordingly, the second signal detector 4 does not generate the detection output thereof. However, the input of the first signal detector 3 is still maintained during the duration of the regenerated output, so that the first signal detector 3 also generates its detection output. If the lock-out tone is received from the input terminal 8, the input of the second signal detector 4 is still maintained regardless of the opening of the contacts 6. Accordingly, the second signal detector 4 generates its detection output after the time $T_{d2}$. While the input of the first signal detector 3 is terminated after the time $T_{d1}$ in response to the opening of the contacts 6, since the detection output thereof is still maintained during the time $T_{h1}$ so that the contacts 6 are opened and the second signal detector 4 generates its output within the time $T_{h1}$ after the time $T_{d2}$, the relay winding 5 is excited through the diode 10 by the detection output of the signal detector 4 to continuously actuate the relay X. Accordingly, it is understood that the lock-out tone is regenerated if the first signal detector 3 still generates its detection output after a time $(T_{d1} + T_{h1})$ while the lock-out tone is received if the second signal detector 4 still generates its detection output after the same time $(T_{d1} + T_{h1})$. A regenerated tone is not transmitted from the terminal 8 to a telephone line during a duration where the contacts 6 are opened after the time $T_{d1}$ from the start of the regenerated lock-out tone. However, this causes no trouble for hearing the stored contents from the memory device, since the contacts 6 are closed in response to the restoration of the relay X which is caused after the time $T_{h1}$ from the termination of the regenerated lock-out tone.

With reference to FIG. 2, another example of this invention comprises the same circuit elements 1 to 10 as employed in the example shown in FIG. 1, and an oscillator 13 for generating a tone signal having a frequency different from the frequency of the lock-out tone which can be distinguished by the second signal detector 4 from the lock-out tone. The relay winding 5 controls the contacts 6 having a make-contact 12 and a break contact 11. In this example, the time $T_{h1}$ and $T_{d2}$ satisfy the following relationship: $T_{h1} > T_{d2}$. In operation, when the lock-out tone is regenerated through the magnetic head 1 and the amplifier 2 or received from the terminal 8, the first detecting circuit 3 generates its detection output after the time $T_{d1}$ so that the relay X is actuated so as to connect the common contact 6 with the make contact 12. If the lock-out tone is the regenerated one, the first signal detector 3 maintains its detection output regardless of the switching of the relay X. If the lock-out tone is the received one, while the detection output of the first signal detector 3 is terminated after the time $T_{h1}$ from the termination of the input of the first signal detector 3 at the time $T_{d1}$, the relay X is continuously actuated since the detection output of the second signal detector 4 is applied through the diode 10 to the winding 5 of the relay X before the termination of the detection output of the first signal detector 3. Since the output of the oscillator 13 is transmitted to a telephone line from the terminal 8 after the relay X is actuated, the output of the oscillator 13 is employed in place of the regenerated lock-out tone. Accordingly, the lock-out tone is detected as a regenerated one if the first signal detector 3 still generates its detection output after a time ($T_{d1} + T_{h1}$), while the lock-out tone is detected as a received one if the second signal detector 4 still generates its detection output after the time ($T_{d1} + T_{h1}$). The above transmission of the output of the oscillator 13 to the telephone line has no relation with the detection of the lock-out tone.

With reference to FIG. 3, another example of this invention comprises a regenerating magnetic head 1, an amplifier 2, a transformer 7, terminals 8a and 8b connected to a telephone line, a signal detector 3, a relay winding 5 of a relay X, contacts 6 of the relay X, resistors 19, 20, 21 and 22, transistors 23 and 24, a capacitor 25, a voltage comparator 26 such as a differential amplifier having two differential inputs, and a dc source 27 for generating a reference dc voltage $E_c$ applied to one of the two differential inputs. The resistor 22 and the capacitor 25 form an integrating circuit which integrates a dc voltage $E_b$ higher than the reference dc voltage $E_c$ and applies the integrated output to the other of the two differential inputs of the comparator 26. The transistor 24 is connected across the capacitor 25 and normally assumes the ON-state to discharge the integrated output of the integrating circuit. The transistor 23 and the resistors 19 and 20 serve as means for stopping the discharge function of the transistor 24 in response to the detected output of the signal detector 3.

With reference to FIGS. 3 and 4, the operation of the example shown in FIG. 3 is described for a regenerated lock-out tone through the magnetic head 1 and the amplifier 2. the signal detector 3 generates its detection output after a time $T_d$ from the application of its input, and the detection output of the signal detector 3 is maintained during a time $T_h$ after the termination of the input of this signal detector 3. Since the regenerated lock-out tone is applied to the signal detector 3 through the normally closed contacts 6, the potential of a point B assumes a high potential after the time $T_d$ so that the transistors 23 and 24 are switched to the ON-state and the OFF-state respectively while the relay X is actuated by the current of the winding 5 so as to open the contact 6. the potential of a point C starts to rise from this time with a time constant determined by respective values R and C of the resistor 22 and the capacitor 25. However, since the input of the signal detector 3 is terminated in response to the opening of the contacts 6, the potential of the point B is reduced after the time $T_h$ so that the transistors 23 and 24 are switched to the OFF-state and the ON-state respectively to lower the potential of the point C. Since the above operations are repeated in case of regeneration of the lock-out tone, the potential of the point C does not exceed the reference voltage $E_c$ and the potential of the output point D of the voltage comparator 26 is not changed.

With reference to FIGS. 3 and 5, the operation of the example shown in FIG. 3 is described for a received lock-out tone from the terminals 8a and 8b. Since the received tone is applied to the signal detector 3 through the transformer 7, the relay X is actuated after the time $T_d$ to open the contacts 6. At the same time, the transistors 23 and 24 are switched to the ON-state and the OFF-state respectively so that the potential of the point C starts to rise with a time constant RC. Since the tone is applied through the transformer 7 as mentioned above regardless of the open condition of the contacts 6, the detection output of the signal detector 3 is still maintained unless the tone is terminated. If the raised potential of the point C substantially reaches the reference voltage $E_c$, the potential of the output point D of the comparator 26 becomes high.

the above circuit elements 19, 20, 21, 22, 23, 24, 25, 26 and 27 may be provided at the output of the second signal detector 4 in the examples shown in FIGS. 1 and 2 in the same arrangement as mentioned above.

As mentioned above, if a tone is applied to the signal detector 3 in this example, the transmission direction of the tone on a two-way transmission line can be clearly detected after a predetermined time ($T_d + RC \ln \{ E_b/(E_b - E_c) \}$).

The above description relates to the detection of the transmission direction of the same tone on a two-way transmission line. If the same tone has N-possible transmission directions, it is readily understood that the instant transmission direction of the tone can be detected by the use of (N − 1) contacts of the relay X and N-signal detectors. This is equivalent to (N − 1) two-way transmission lines, which require (N − 1) detection systems of this invention.

As mentioned above, since the transmission direction of a tone on a two-way transmission line can be clearly detected in accordance with this invention, this invention is useful to detect the transmission direction of a tone in a case where recorded contents of a telephone answering and recording device are regenerated and transmitted in a two-way telephone line in response to a remote control operation.

What I claim is:

1. A system for detecting the transmission direction of a signal on a two-way transmission line, comprising:
    signal detection means responsive to said signal for developing an output signal in response thereto, said signal detection means having and input connected to the two-way transmission line for receiving said signal;
    switch means for switching between an ON and an OFF state and connected to a junction between said signal detection means and the two-way transmission line and normally assuming the ON-state;
    control means electrically coupled to said signal detection means and said switch means for switching said switch means from the ON-state to the OFF-state when said signal detection means develops an output signal, whereby the transmission direction of said signal on the two-way transmission line is represented by whether or not the output signal of said signal detector is developed after said switch means is in the OFF-state;
    a comparator having two differential input terminals,
    a first dc source connected to one of said two differential input terminals of said comparator for applying to the same a dc reference voltage
    a second dc source for generating a predetermined dc voltage higher than said reference voltage,
    an integrating circuit having an input connected to said second dc source and an output connected to the other of said two differential input terminals of said comparator for integrating said predetermined dc voltage, discharge means connected to said integrating circuit and operable for discharging the integrated output of said integrating circuit, and means connected to said signal detection means and said discharge means for stopping the discharge function of said discharge means in response to the output signal of said signal detector.

2. A system for detecting the transmission direction of a signal on a two-way transmission line, comprising:

switch means inserted in said two-way transmission line for switching between an ON and an OFF-state and normally assuming the ON-state;

first signal detection means responsive to said signal for developing an output signal having a certain duration and after a certain period of delay; said first signal detection means connected to said two-way transmission line at one side of said switch means;

second signal detection means responsive to said signal for developing an output signal after a certain period of delay greater than the delay period of said first signal detection means and less than the sum of the delay period and the duration of the output signal of said first signal detection means, said second signal detection means connected to said two-way transmission line at the other side of said switch means; and control means responsive to the detector output signals and electrically coupled to said first signal detection means, said second signal detection means and said switch means for switching said switch means from the ON-state to the OFF-state when at least one of said first signal detection means and said second signal detection means output signals are applied thereto in response to the detection of said signal; whereby the transmission direction of said signal on said two-way transmission line is represented by which of said first signal detection means and said second signal detection means develops an output signal after said switch means is in the OFF-state.

3. A system according to claim 2, further including:
a comparator having two differential input terminals,
a first dc source connected to one of said two differential input terminals of said comparator for applying to the same a dc reference voltage,
a second dc source for generating a predetermined dc voltage higher than said reference voltage,
an integrating circuit having an input connected to said second dc source and an output connected to the other of said two differential input terminals of said comparator for integrating said predetermined dc voltage,
discharge means connected to said integrating circuit and operable for discharging the integrated output of said integrating circuit, and
means connected to said second signal detection means and said discharge means for stopping the discharge function of said discharge means in response to the output signal of said second signal detector.

4. A system for detecting the transmission direction of a signal on a two-way transmission line, comprising:

transfer switch means having a break contact, a make contact and a common contact for switching from a first state with said break and common contacts electrically connected, to a second state with said make and common contacts electrically connected, said transfer switch means inserted in said two-way transmission line normally assuming the first state;

first signal detection means responsive to said signal for developing an output signal having a certain duration and after a certain period of delay, said first signal detection means connected to the break contact side of said switch means at said two-way transmission line;

second signal detection means responsive to said signal for developing an output signal after a certain period of delay less than the duration of the output signal of said first signal detection means, said second signal detection means connected to the make contact side of said switch means; and control means responsive to the detector output signals and electrically coupled to said transfer switch means, said first signal detection means and said second signal detection means for switching the common contact of said switch means from the break contact to the make contact in response to a detector output signal, whereby the transmission direction of said signal on said two-way transmission line is represented by which of said first signal detection means and said second signal detection means develops an output signal after said switch means is switchedfrom the break contact to the make contact. switched from 5. A system according to claim 4, further including:
a comparator having two differential input terminals,
a first dc source connected to one of said two differential input terminals of said comparator for applying to the same a dc reference voltage,
a second dc source for generating a predetermined dc voltage higher than said reference voltage,
an integrating circuit having an input connected to said second dc source and an output connected to the other of said two differential input terminals of said comparator for integrating said predetermined dc voltage,
discharge means connected to said integrating circuit and operable for discharging the integrated output of said integrating circuit, and
means connected to said second signal detection means and said discharge means for stopping the discharge function of said discharge means in response to the output signal of said second signal detector.

* * * * *